United States Patent [19]
Shimada et al.

[11] Patent Number: 5,839,846
[45] Date of Patent: Nov. 24, 1998

[54] JOINT STRUCTURE FOR CONTROL CABLE

[75] Inventors: Tatsuo Shimada, Amagasaki; Keizo Tani; Tomoyuki Tokunaga, both of Utsunomiya; Yuichi Tanii, Sagamihara; Shuichi Hannya, Fujisawa; Takehiro Kuroda, Atsugi; Masao Matsumoto, Yokohama, all of Japan

[73] Assignees: Nippon Cable System Inc., Takarazuka; Nissan Motor Co., Ltd., Yokohama, both of Japan

[21] Appl. No.: 628,209

[22] Filed: Apr. 5, 1996

[30] Foreign Application Priority Data

Apr. 7, 1995 [JP] Japan .................................. 7-082892

[51] Int. Cl.⁶ .................................................. F16C 11/10
[52] U.S. Cl. ............................ 403/164; 403/13; 403/329; 74/473.3; 74/522
[58] Field of Search ..................................... 403/119, 164, 403/165, 154, 155, 13, 225, 221, 326, 328, 329; 74/473 R, 522, 473.3

[56] References Cited

U.S. PATENT DOCUMENTS

| | | | |
|---|---|---|---|
| 1,835,575 | 12/1931 | Sanders et al. ........................ | 403/225 |
| 3,526,413 | 9/1970 | Muller ................................. | 403/119 X |
| 4,132,124 | 1/1979 | Iida ........................................ | 74/473 R |
| 4,158,511 | 6/1979 | Herbener .............................. | 403/225 X |
| 5,218,880 | 6/1993 | Mizutani ........................... | 74/473 R X |
| 5,267,807 | 12/1993 | Biedermann et al. ............... | 403/326 X |
| 5,397,081 | 3/1995 | Landry et al. ......................... | 403/13 X |
| 5,638,720 | 6/1997 | Weinhart et al. ...................... | 74/473 R |

Primary Examiner—Harry C. Kim
Attorney, Agent, or Firm—Foley & Lardner

[57] ABSTRACT

A joint structure for a control cable includes an annular cable-end member provided on an end of the control cable, a columnar sleeve arranged in the annular cable-end member and a pair of bushes of the same configuration. Each bush includes an annular part, a cylindrical part, a pair of claw parts and a pair of cradle parts. In this arrangement, the cylindrical part, which is made of elastic material, is inserted between the sleeve and the cable-end member, while a pair of claw parts are engaged with the cradle parts of the opposing bush. The sleeve is provided on the side face with a circumferential bead, interposed between leading ends of the opposing bushes. Even if any force is exerted between the cable-end member and the sleeve, no deformation is caused in the cylindrical parts because of its inelasticity, while the bead prevents relative displacement.

16 Claims, 8 Drawing Sheets

JOINT STRUCTURE FOR CONTROL CABLE

BACKGROUND OF THE INVENTION

The present invention relates to a joint structure for a control cable. More particularly, it relates to a joint structure for a control cable used for transmitting a stroke of a gear shifting lever to a manual lever of a transmission for a vehicle or the like.

In a prior art, there is a known joint structure for control cables as shown in FIGS. 1 to 5 [see Japanese Unexamined Patent Publication (k^kai) No. 5-50868 as the similar prior art].

Figure 1:
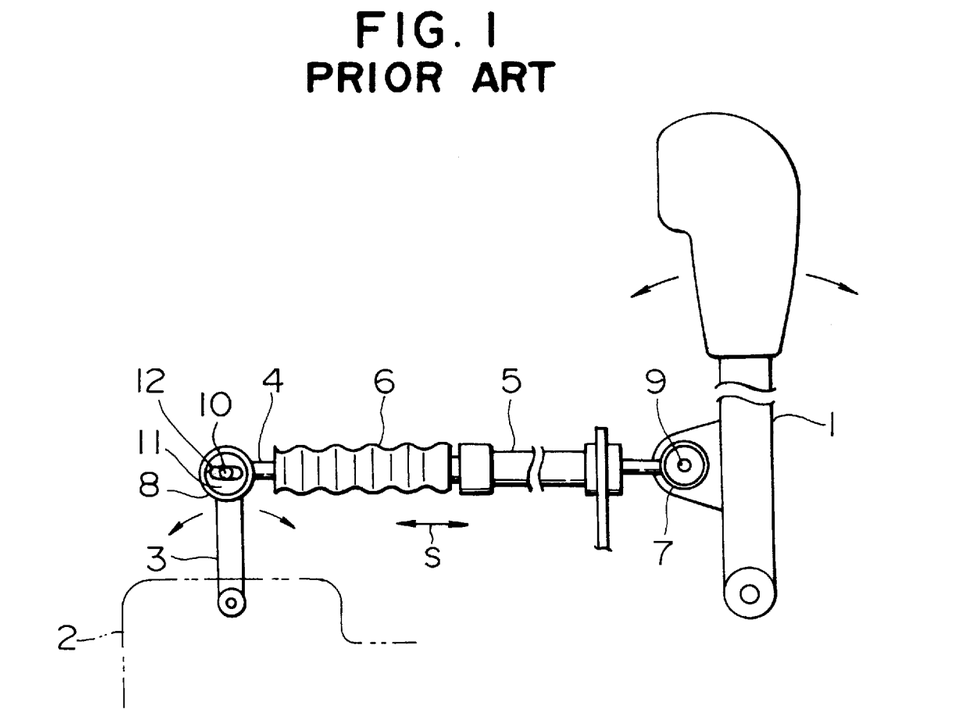
FIG. 1 is a view showing a connection between the gear shifting lever and the manual lever in the conventional joint structure.

In FIG. 1, a gear shifting lever 1 is pivotally arranged in a vehicle body not shown while a manual lever 3 is pivotally mounted on a transmission 2. The gear shifting lever 1 is connected to the manual lever 3 through the intermediary of a control cable 4 for transmitting strokes of the lever 1 corresponding to its gear shifting operations. Being covered with an outer tube 5 and dust boots 6, the control cable 4 is provided on both ends thereof with annular cable-end members 7, 8, respectively. The cable-end member 7 on the side of the gear shifting lever 1 is rotatably joined to a pin 9 of the lever 1 while the cable-end member 8 on the side of the manual lever 3 is joined to a pin 10 of the lever 3.

Especially, the linkage between the pin 10 on the side of the manual lever 3 and the cable-end member 8 is constructed so as to adjust changes in relative position between the lever 3 and the pin 8 and to convert a movement of the control cable 4 in the stroke direction S into a pivotal movement of the manual lever 3. That is, since the relationship in position between the pin 10 and the cable-end member 8 is not always constant due to manufacturing errors in length of the control cable 4 and assembling errors in distance between the manual lever 3 and the gear shifting lever 1, the above linkage is adapted to adjust and absorb the changes in relative position between the pin 10 and the cable-end member 8. Further, where the cable-end member 8 is joined to the pin 10 in a simple manner, the manual lever 3 fails to pivot. Therefore, a joint of the pin 10 is arranged so as to rotate in the cable-end member 8.

In order to realize two functions mentioned above, the cable-end member 8 carries a flattened cylindrical sleeve 12 therein through a substantially potbellied bush 11. The sleeve 12 is shaped to have a cross section of elongated circle. In order to smooth the rotation of the bush 11 in the cable-end member 8, grease is also applied therebetween, while the sleeve 12 is glued to the bush 11 by adhesive agent 13 ( see FIG. 5). In the fitting form of the bush 11 in the cable-end member 12, a side face 11a of the bush 11 is has a convex surface while an inner face 8a of the cable-end member 8 is has a concave face. Owing to the engagement, once the bush 11 is fitted in the cable-end member 8, the bush 11 will never fall out of the cable-end member 8. The bush 11 is made of elastic material such as polyurethane for facilitating its fitting into the cable-end member 8. Then, the pin 10 of the manual lever 3 is inserted into the sleeve 12 and secured thereto by a nut 14 at an optional position to absorb the above-mentioned errors. Consequently, while the pin 10 of the manual lever 3 is fixed to the sleeve 12 with the arrangement as mentioned above, it allows a linear movement of the control cable 4 in the direction S to be converted into the pivotal movement of the manual lever 3 since the bush 11 is capable of rotating in the cable-end member 8.

Figure 2:
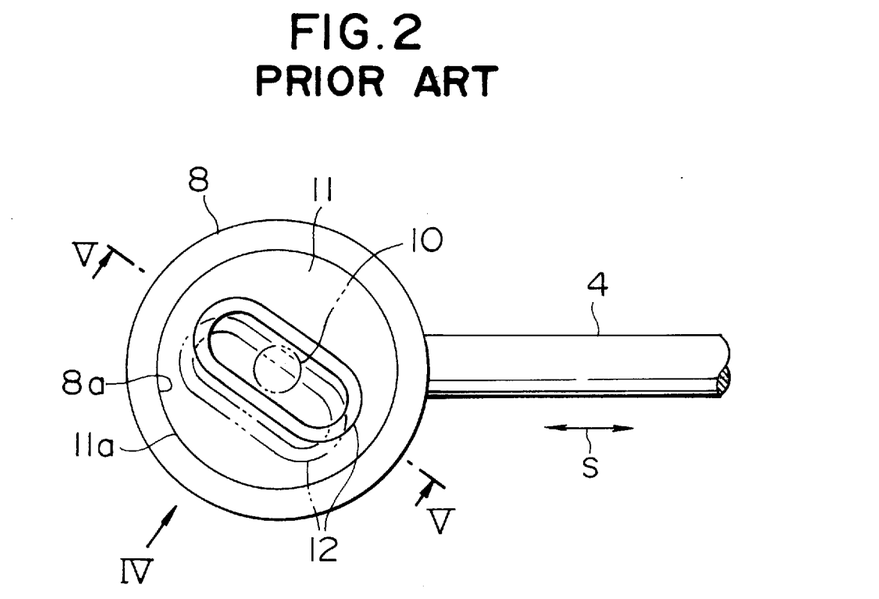
FIG. 2 is a plan view showing the conventional joint structure for the control cable.
Figure 3:
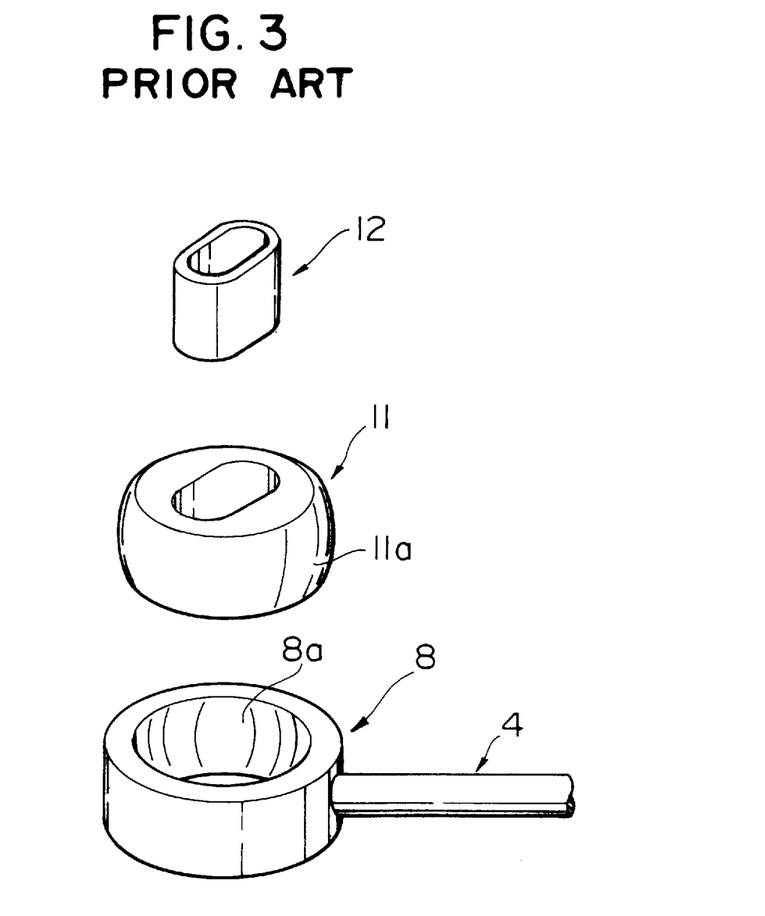
FIG. 3 is an exploded perspective view showing the conventional joint structure for the control cable.
Figure 4:
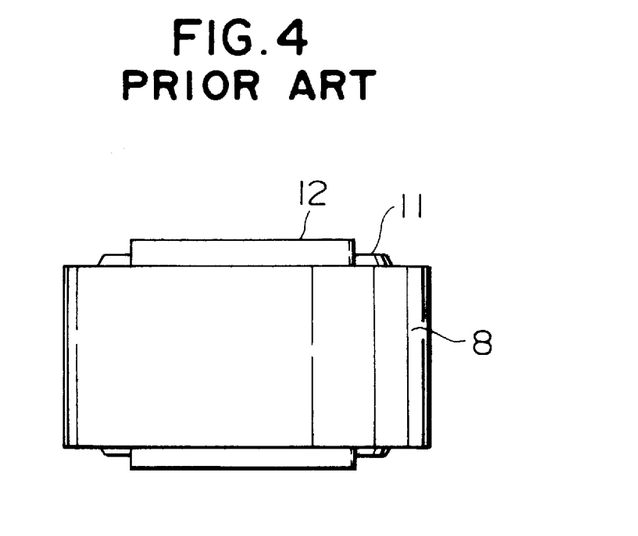
FIG. 4 is a lateral view of the conventional joint structure, viewed in a direction of arrow IV of FIG. 2.
Figure 5:
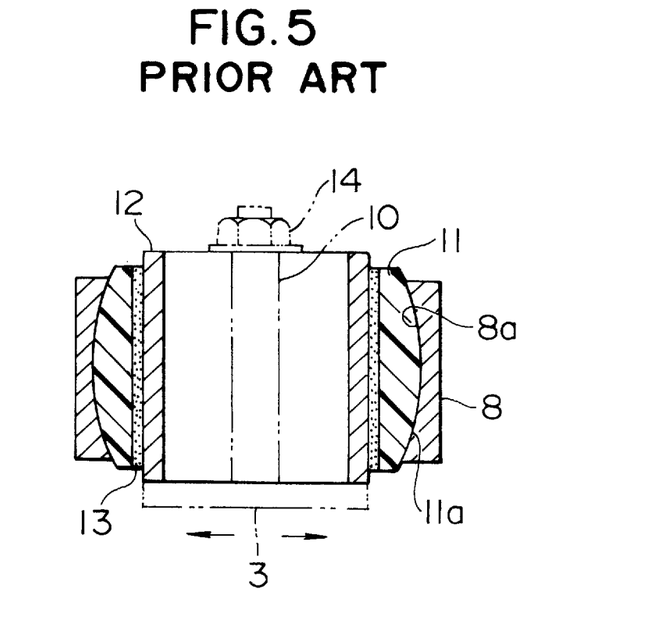
FIG. 5 is a cross sectional view of the conventional joint structure, taken along a line V—V of FIG. 2.

In the above-mentioned prior art, however, if any force is applied between the cable-end member 8 and the sleeve 12 in converting the liner movement of the control cable 4 into the pivotal movement of the manual lever 3, the bush 11 may be deformed to cause a relative displacement of the sleeve 12 in the cable-end member 8 (see double-dotted lines of FIG. 2). This is because the bush 11 is formed by an elastic member. When the sleeve 12 is displaced in the bush 11 relatively, a stroke of the control cable 4 cannot be transmitted to the manual lever 3 precisely thereby to influence the manipulation for the transmission 2. In order to counter such a problem, the hardness of the bush 11 is increased so as not to deform it. However, if the hardness of the bush 11 is increased so much, it will be difficult to fit the bush 11 into the cable-end member 8

Additionally, since the sleeve 12 is joined to the bush 11 by means of the adhesive agent 13 to prevent it from falling out, this joint structure is disadvantageous in cost due to the necessity of the adhesive agent 13 and also in terms of operative efficiency since the solidification of the agent 13 takes time.

SUMMARY OF THE INVENTION

It is therefore an object of the present invention to provide a joint structure for a control cable, which is capable of preventing a sleeve from displacing in a cable-end member without an adhesive agent.

The object of the present invention described above can be accomplished by a joint structure for a control cable, which transmits a stroke of a gear shifting lever to a manual lever of a transmission, the joint structure comprising:

an annular cable-end member provided on an end of the control cable;

a columnar sleeve arranged in the annular cable-end member, the sleeve having an elongated through hole through which a pin of the manual lever is fixed optionally;

a pair of bushes having cylindrical parts respectively inserted between the sleeve and the cable-end member from both sides of the cable-end member for rotatably supporting the sleeve, the cylindrical parts being made of elastic material;

engaging means for allowing the bushes to be carried by the cable-end member, the engaging means being provided on either of the bushes and the cable-end member; and positioning means for positioning the sleeve with respect to the cable-end member, the positioning means being formed on either of the sleeve and the bushes.

With the arrangement mentioned above, since the bushes include the cylindrical parts, which are interposed between the cable-end member and the sleeve and made of elastic material, the cylindrical parts would not be deformed even if any force is exerted between the cable-end member and the sleeve. Therefore, any relative displacement is not raised in the sleeve accommodated in the cable-end member. Thus, the stroke of the control cable is transmitted to the manual lever precisely, whereby a reliable manipulation for the transmission can be realized. In addition, since the bushes are carried on the cable-end member by the engaging means while the sleeve is carried by the positioning means, there is no need to use any adhesive agent, thus being economical and improving the operational efficiency in assembling the joint structure. Note, that the above elastic material may be "hard" resinous material such as polyacetal resin.

In the present invention, preferably, the bushes are provided with misassembly-proofing means. In such a case, it is possible to prevent the bushes from being shipped under condition that the bushes are not engaged in the cable-end member.

More preferably, a half of the difference between a width of the clearance and a width of the bead is established to be smaller than either of respective projecting lengths of the sleeve projecting from the bushes. With the establishment mentioned above, there can be realized such a condition that the upper and lower end faces of the sleeve always project from the bushes. Accordingly, this arrangement allows the pin of the manual lever to be fixed to the only sleeve. In addition, since the manual lever and the nut do not interfere with the bushes or the like, the smooth rotational movement of the sleeve can be maintained.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Preferred embodiments of the present invention will be described with reference to the drawings. Note, that in these drawings, elements in common with those of the above-mentioned conventional joint structure are indicated by the same reference numerals, respectively and their overlapping descriptions will be avoided.

FIGS. 6 to 9 show the first embodiment of the present invention. Different from the conventional structure, a cable-end member 15 has a generally-cylindrical inner face rather than a concave inner face. Also, a sleeve 16 is constituted by a basically columnar member made of metal (steel), different from the flattened-cylindrical sleeve in the conventional structure. Provided with an elongated-hole shaped through hole 17, the sleeve 16 further includes a circumferential bead 18 formed in the middle of a side wall of the sleeve 16.

Reference numerals 19, 20 denote a pair of bushes of the same configuration, which are made of polyacetal resin as "hard" resinous material. The bushes 19, 20 contain lubricating oil in advance, exhibiting self-lubricating property. The bushes 19, 20 are composed of cylindrical parts 19a, The sleeve 16 and the cable-end member 15, are interposed between the bushes. The annular parts 19b, 20b to be abutted against end faces of the cable-end member 15, two pairs of claw parts 19c, 20c and two pairs of cradle parts 19d, 20d act as an "engaging part (means)" of the joint structure. These parts are alternately formed on the annular parts 19b, 20b at regular intervals, respectively. The length of each cylindrical part 19a, 20a is established somewhat smaller than a distance between the end face of the sleeve 16 and the central bead 18. Furthermore, in the respective bushes 19, 20, a distance (peripheral gap) B between each claw part 19c, 20c and the adjoining cradle part 19d, 20d is defined to be smaller than a width (peripheral length) A of the cradle part 19d, 20d, providing a "misassembly-proofing part (means)" of the structure (see FIG. 7).

We now describe steps of joining the pin 33 of the manual lever 30 to the cable-end member 15.

Figure 6:
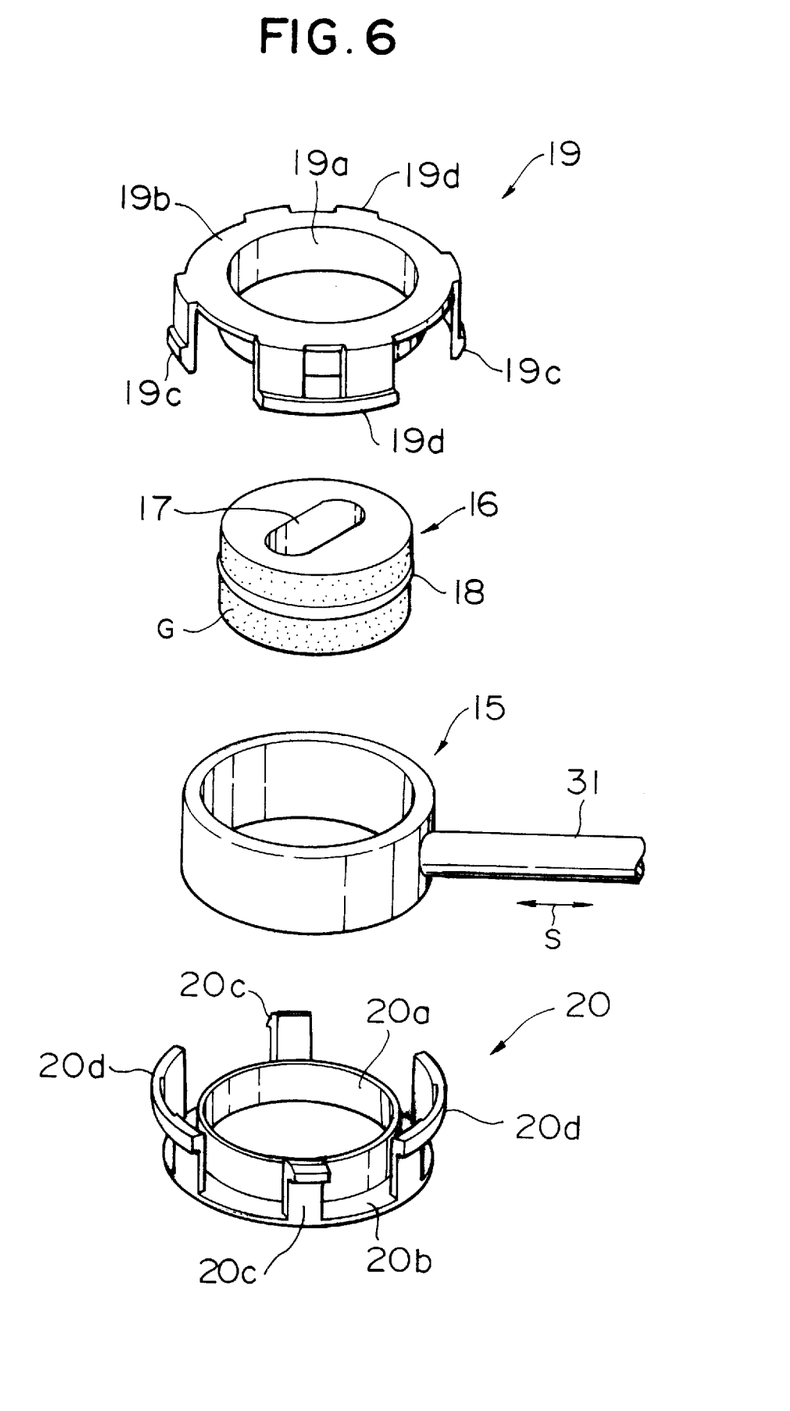
FIG. 6 is an exploded perspective view showing a joint structure for a control cable, in accordance with a first embodiment of the present invention.
Figure 7:
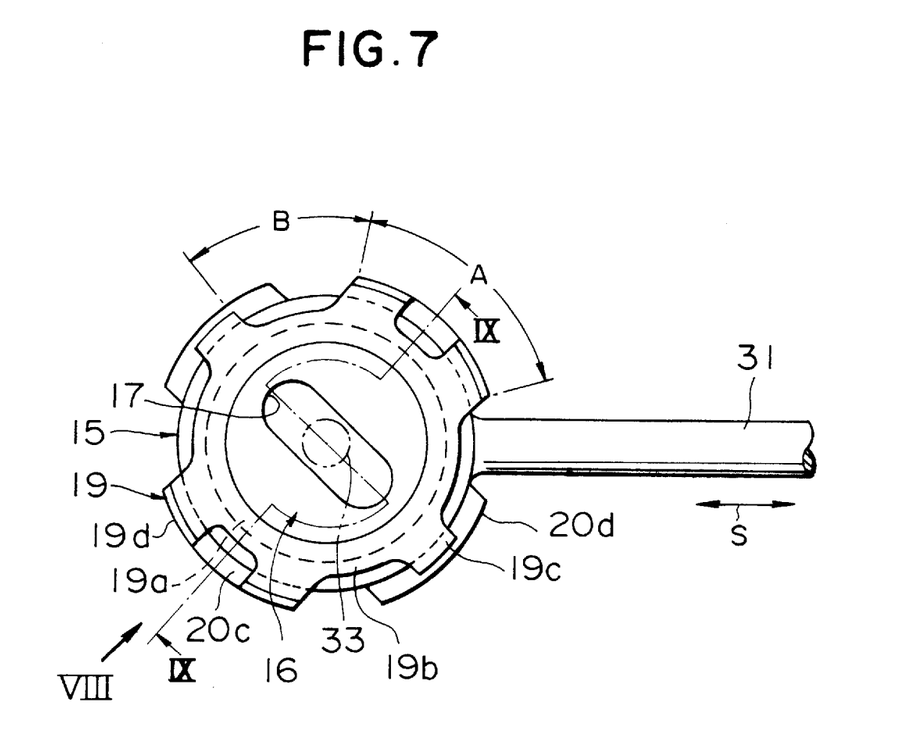
FIG. 7 is a plan view of the joint structure of FIG. 6 in the assembled condition.
Figure 8:
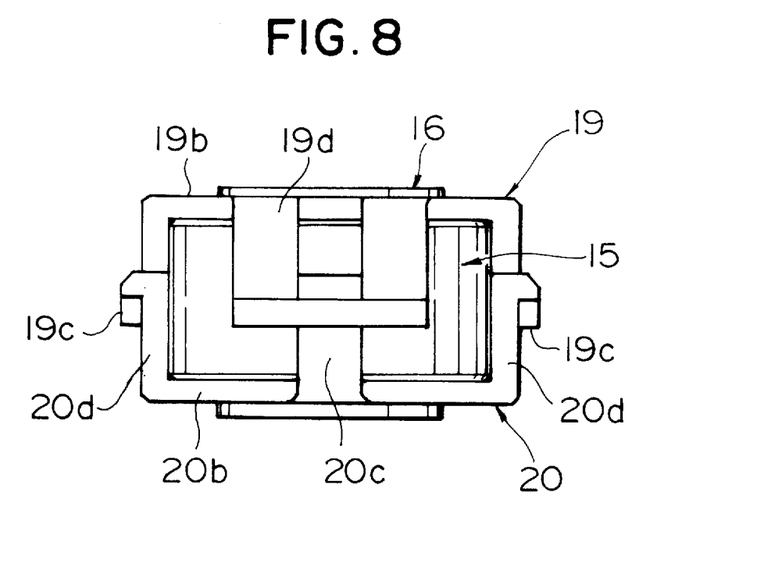
FIG. 8 is a lateral view of the joint structure, viewed in a direction of arrow VIII of FIG. 7.

First of all, a layer of grease G is spread thinly on the side face (outer wall) of the sleeve 16 for smoothing its rotational operation. Next, upon engaging the sleeve 16 in the cable-end member 15, the cylindrical parts 19a, 20a of the respective bushes 19, 20 are inserted between the side face of the sleeve 16 and the inner face of the cable-end member 15 from the upper and lower sides. Note, that the insertion of the cylindrical parts 19a, 20a of the bushes 19, 20 are carried out while the positions of the claw parts 19c, 20c of the bushes 19, 20 have been adjusted for the corresponding cradle parts 19d, 20d, respectively. Thus, with the above insertion of the respective cylindrical parts 19a, 20a, the claw parts 19c, 20c engage with the cradle parts 19d, 20d respectively, whereby the bushes 19, 20 can be joined to each other.

Now, since the distance B between each claw part 19c, 20c and the adjoining cradle part 19d, 20d is defined so as to be smaller than the width A of the cradle part 19d, 20d (i.e., A>B), it is impossible to execute the insertion of the cylindrical parts 19a, 20a while the claw parts 19c, 20c are not respectively fitted to the cradle parts 19d, 20d perfectly. Providing that the distance A is smaller than the width B conversely (i.e., A<B), such an establishment allows the cradle part 19d (or 20d) of the bush 19 (or 20) to enter a space between the claw part 20c (or 19c) and the cradle part 20d (or 19d) of the opposite bush 20 (or 19). Consequently, this would cause an imperfect assembly where the only cylindrical parts 19a, 20a are inserted into the cable-end member 15 despite that the bushes 19, 20 are not engaged with each other. On the contrary, according to the embodiment, since the above-mentioned relationship of "A>B" is established in advance, it is possible to exclude the possibility of such an imperfect assembly. Therefore, it is possible to prevent the bushes 19, 20 from being shipped under condition that they are not engaged in the cable-end member 15.

Figure 9:
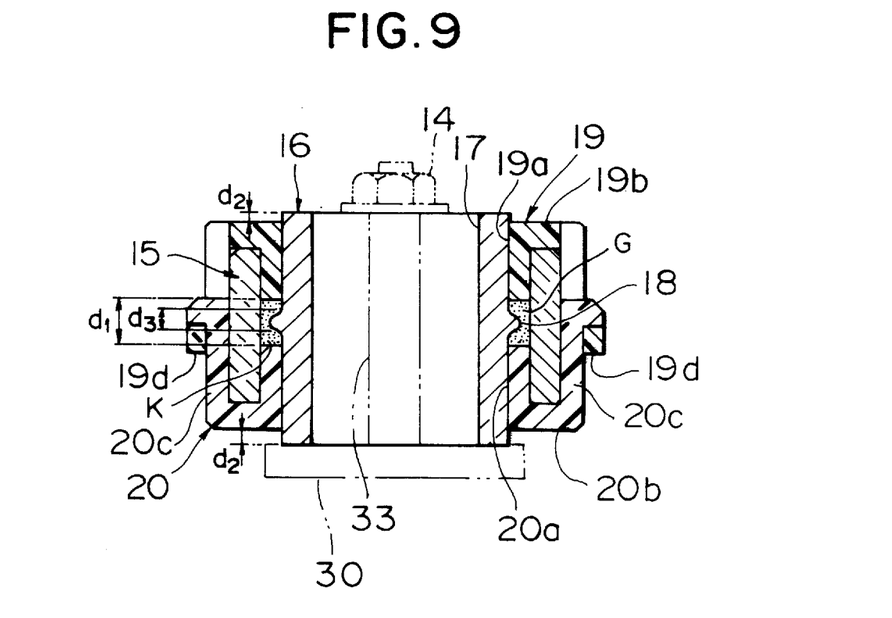
FIG. 9 is cross sectional view of the joint structure, taken along a line IX of FIG. 7.

While both of the bushes 19, 20 are joined to each other, as shown in FIG. 9, a clearance K of a predetermined width d1 is defined between respective leading ends of the cylindrical parts 19a, 20a, while both of the end faces of the sleeve 16 project from the bushes 19, 20 by respective projection lengths d2, respectively.

According to the embodiment, a "positioning part (means)" of the joint structure is composed of the clearance K and the bead 18. The bead 18 of a predetermined width d3 is positioned in the clearance K while it is filled up with the grease G gathered in inserting the cylindrical parts 19a, 20a. Since the bead 18 of the sleeve 16 is engaged in the clearance K, the sleeve 16 would not be put out of the cable-end member 15. In this way, since the holding of the sleeve 19 is accomplished by not using adhesive agents, it is advantageous to in manufacturing cost while improving the operative efficiency. Furthermore, since the bushes 19, 20 per se possess self-lubricating property while predetermined amounts of grease G is retained in the clearance K, it is possible to maintain smooth rotational performance of the sleeve 16 for a long term without frequently applying the grease G. In addition, owing to the bushes 19, 20 having an identical configuration, only one kind of mold for the bushesis needed. Both bushes 19, 20 can be provided simultaneously. Thus, it is possible to reduce the number of kinds of parts required for the joint structure, thereby being economical.

Next, the pin 33 of the manual lever 30 is inserted into the elongated through hole 17 of the sleeve 16 assembled in the above way and thereafter, the nut 14 is screwed on a tip of the pin 33 in an optional position where errors in length of the control cable 31 can be adjusted. In this way, the sleeve 16 is fixed tightly between the nut 14 and the manual lever 30. Although the sleeve 16 is movable up and down within a range of the width d1 of the clearance K since the width d1 is larger than the width d3 of the bead 18 on the sleeve 16, the dimensions of the joint structure are established so that respective end faces of the sleeve 16 always project from the bushes 19, 20. In detail, the sleeve 16 is movable or down in the figure in a span equal to a half of difference between the width d1 of the clearance K and the width d3 of the bead 18. According to the embodiment, since each movable span of [(d1−d3)/2] of the sleeve 16 up and down is smaller than either one of respective projecting lengths d2 on both sides of the projecting sleeve 16, it can be realized that the upper and lower end faces of the sleeve 16 always project from the bushes 19, 20. Accordingly, such an arrangement allows the metallic sleeve 16 to be always tightened by the nut 14 and the manual lever 30. In addition, since the manual lever 30 and the nut 14 do not interfere with the bushes 19, 20 while the lever 30 is pivoting, so that the smooth rotational movement of the sleeve 16 can be maintained.

Since the cylindrical parts 19a, 20a of the bushes 19, 20 interposed between the sleeve 16 and the cable-end member 15 are made of polyacetal resin as "hard resinous material", even if the force in the direction S is exerted between the cable-end member 15 and the sleeve 16 in converting the linear movement of the control cable 31 into the pivotal movement of the manual lever 30, the cylindrical parts 19a, 20a are not deformed, so that it does not displace the sleeve 16 relate to the cable-end member 15. Thus, the stroke of the control cable 31 is transmitted to the manual lever 30 precisely, whereby a reliable manipulation for the transmission can be realized.

Figure 10:
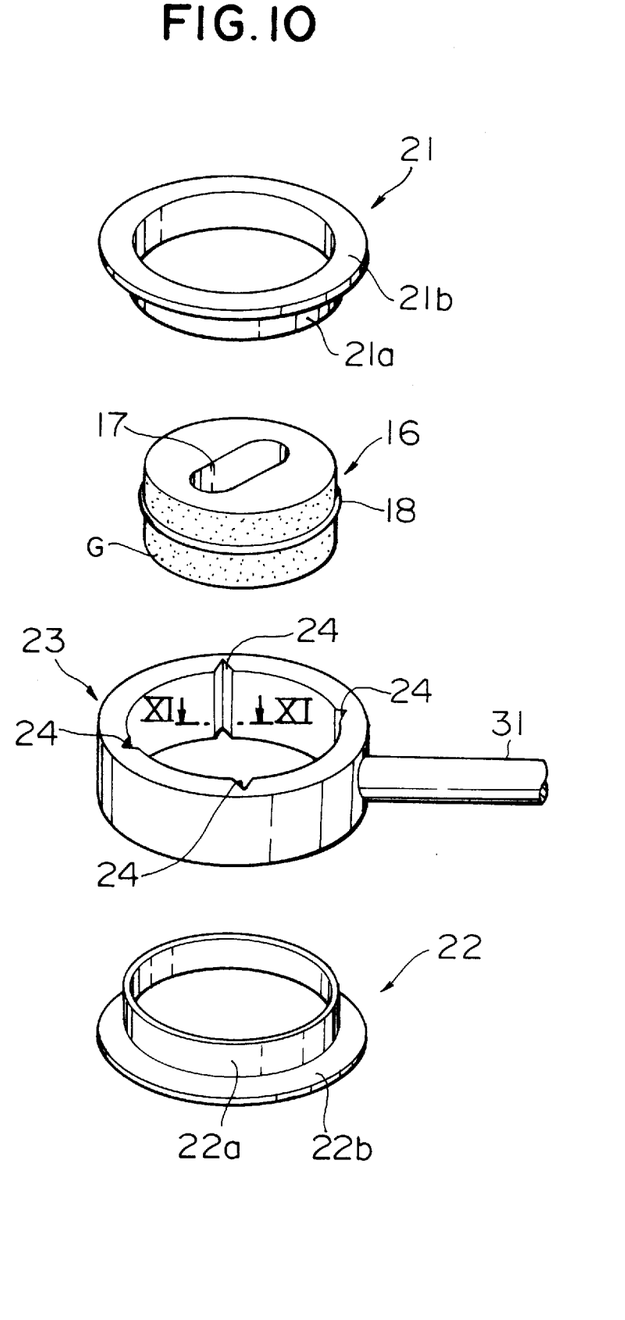
FIG. 10 is an exploded perspective view showing a joint structure for a control cable, in accordance with a second embodiment of the present invention.
Figure 11:
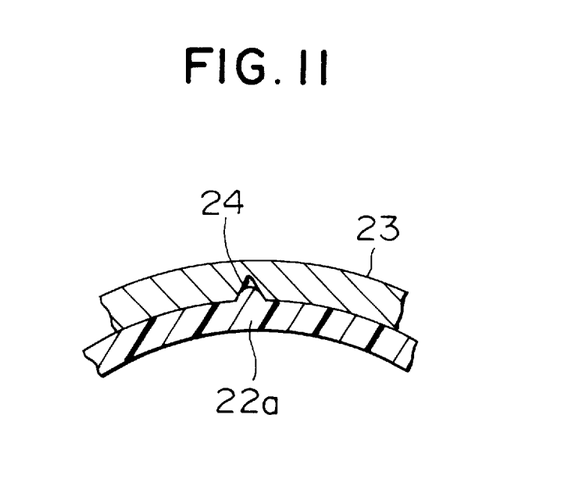
FIG. 11 is a cross sectional view of the joint structure, taken along a line XI -of FIG. 10.

FIGS. 10 and 11 show the second embodiment of the present invention. Note, that this embodiment relates to a modification of the above-mentioned "engaging part (means)" of the joint structure. Bushes 21, 22 in accordance with the embodiment comprise cylindrical parts 21a, 22a and annular parts 21b, 22b in a simple configuration, while a cable-end member 23 is provided on an inner face thereof with four grooves 24 as the engagement part. Accordingly, since the cylindrical parts 21a, 22a gnaw into the grooves 24 partially while the parts 21a, 22a are inserted between the cable-end member 23 and the sleeve 16, it is possible to attach the bushes 21, 22 to the cable-end member 23 securely even though the bushes are provided with the claw parts and the cradle parts as the previous embodiment. According to this embodiment, because of the simple configuration of the bushes 21, 22 consisting of the cylindrical parts 21a, 22a and the annular parts 21b, 22b, it becomes is to be easy to manufacture the bushes 21, 22. In addition, owing to the arrangement where the cylindrical parts 21a, 22a of the bushes 21, 22 are gnawed into the grooves 24 of the cable-end member 23 simply, there is no need to position the bushes 21, 22 precisely in order to fit the claw parts to the corresponding cradle parts as the previous first embodiment, so that the inserting and assembling operation of the bushes 21, 22 can be facilitated.

Figure 12:
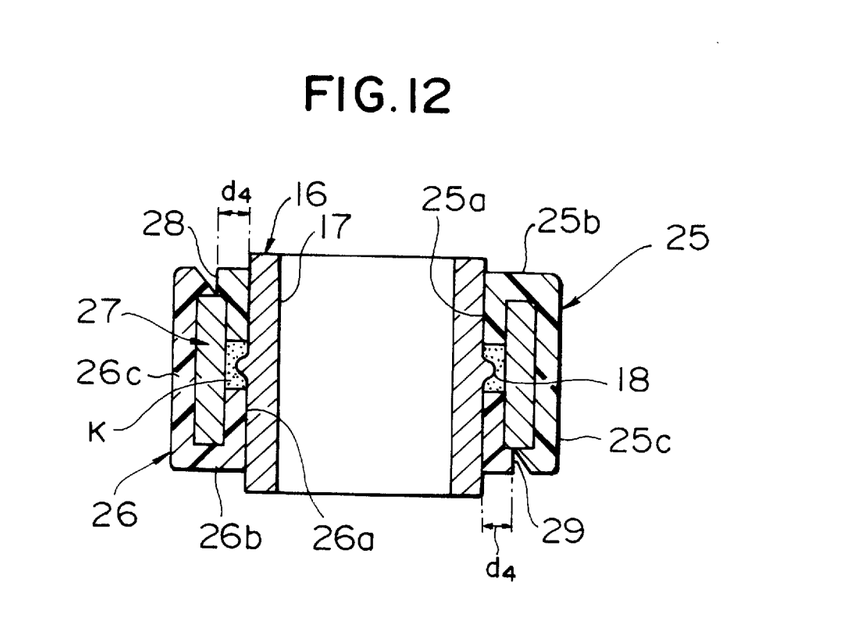
FIG. 12 is a cross sectional view showing a joint structure for a control cable, in accordance with a third embodiment of the present invention.

FIG. 12 shows the third embodiment of the present invention. Note, that this embodiment relates to a modification of the above-mentioned "engaging part (means)" and "misassembly-proofing part (means)" of the joint structure. Bushes 25, 26 in accordance with the third embodiment, comprise cylindrical parts 25a, 26a, annular parts 25b, 25b and hook parts 25c, 26c as the engagement part, respectively. In this arrangement, the hook parts 25c, 26c are engaged with a cable-end member 27 on respective end faces thereof on the opposite side of the bushes 25, 26, respectively. The annular parts 25b, 26b are provided with notch parts 28, 29, which are positioned corresponding to the hook parts 25c, 26c for reducing the respective widths d4 of the annular parts 25b, 26b, respectively. The notch parts 28, 29 are provided to expose the end faces of the cable-end member 27 partially and "the misassembly-proofing part (means)" of the embodiment is constituted by both of the notch parts 28, 29 and the hook parts 25c, 26c. Thus, since no elements are engageable with the hook parts 25c, 26c but the notch parts 28, 29, it is possible to prevent the bushes 25, 26 from being assembled by mistake beforehand.

Although the "positioning part (means)" for the sleeve 16 is constituted by the clearance K and the bead 18 in the above-mentioned embodiments, it is not limited to such a constitution, of course. For example, the sleeve may be provided with one or two circumferential grooves while both/either of the bushes may be provided with one or two projections for engagement with the groove(s) in a modification.

Finally, it will be understood by those skilled in the art that the foregoing description is one of preferred embodiments of the disclosed key cylinder, and that various changes and modifications may be made to the present invention without departing from the spirit and scope thereof.

What is claimed is:

1. A joint structure for a control cable, which is adapted to transmit motion from a gear shifting lever to a manual transmission lever, the joint structure comprising:

an annular member adapted to be connected to the control cable;

a columnar sleeve received in the annular member, the sleeve having an elongated through hole;

a pair of bushes of elastic material rotatably supporting the sleeve relative to the annular member, each of the bushes having a cylindrical member received between the sleeve and the annular member, the cylindrical members being received from opposite ends of the annular member;

engaging means for holding both of said bushes in position relative to the annular member, while allowing the annular member and the bushes to rotate together relative to the columnar sleeve; and positioning means for positioning the sleeve relative to the annular member, the positioning means being formed on one of the sleeve and the bushes.

2. A joint structure as claimed in claim 1, wherein said positioning means comprises a bead formed circumferentially around the middle of a side face of said sleeve and a clearance defined between opposing leading ends of said cylindrical members of said bushes positioned between said sleeve and said annular member.

3. A joint structure as claimed in claim 2, wherein a height of said sleeve is larger than a height of said bushes combined, the difference between a width of said clearance and a width of said bead is smaller than either of respective projecting lengths of said sleeve projecting from said bushes.

4. A joint structure as claimed in claim 2, wherein said engaging means comprises claw parts and cradle parts receiving said claw parts respectively, both of which are provided on said bushes for engaging with each other.

5. A joint structure as claimed in claim 2, wherein said engaging means comprises grooves formed on an inner face of said annular member and into which said cylindrical members of said bushes are engaged.

6. A joint structure as claimed in claim 2, wherein said engaging means comprises hook elements provided on said bushes, each of said hook. elements being engageable with the opposite end of said annular member.

7. A joint structure as claimed in claim 1 wherein said engaging means comprises grooves formed on an inner periphery of the annular member, into which said cylindrical members of said bushes engage.

8. A joint structure as claimed in claim 1, wherein said engaging means comprises hook elements provided on said bushes, each of said hook elements engaging the opposite end of said annular member.

9. A joint structure as claimed in claim 8, wherein said bushes further include misassembly-proofing means for preventing said cylindrical members of said bushes from improperly engaging said annular member.

10. A joint structure as claimed in claim 9, wherein said misassembly-proofing means comprises said hook elements and notch elements formed on said bushes, one of said notch elements of one of said bushes being engaged with one of said hook elements of the other of said bushes.

11. A joint structure for a control cable, which is adapted to transmit motion from a gear shifting lever to a manual transmission lever, the joint structure comprising:

an annular member adapter to be connected to the control cable;

a columnar sleeve received in the annular member, the sleeve having an elongated through hole;

a pair of bushes of elastic material rotatably supporting the sleeve relative to the annular member, each of the bushes having a cylindrical member received between the sleeve and the annular member, the cylindrical members being received from opposite ends of the annular member;

engaging elements formed on each of the bushes, the engaging elements of one of the bushes engaging the engaging elements of the other of the bushes to hold the bushes in position relative to the annular member, while allowing member and the bushes to rotate together relative to columnar sleeve; and position elements formed on one the sleeve and the bushes and position the sleeve relative to the annular member.

12. A joint structure for a control cable, which is adapted to transmit motion from a gear shifting lever to a manual transmission lever, the joint structure comprising:

an annular member adapted to be connected to the control cable;

a columnar sleeve received in the annular member, the sleeve having an elongated through hole;

a pair of bushes of elastic material rotatably supporting the sleeve relative to the annular member, each of the bushes having a cylindrical member received between the sleeve and the annular member, the cylindrical members being received from opposite ends of the annular member;

a claw part formed on one of the bushes and a cradle part formed on the other of the bushes, the claw part and the cradle part engaging each other to hold the bushes in position relative to the annular member, while allowing the annular member and the bushes to rotate together relative to the columnar sleeve; and positioning elements formed on one of the sleeve and the bushes and positioning the sleeve relative to the annular member.

13. A joint structure as claimed in claim 12, wherein said bushes further include misassembly-proofing means for preventing said cylindrical members of said bushes from improperly engaging said annular member.

14. A joint structure as claimed in claim 13, wherein each of the bushes has said claw and cradle parts and said misassembly-proofing means comprises said claw parts and said cradle parts formed on said bushes and wherein a distance between each of said claw parts and the adjoining cradle part is defined smaller than a width of each of said cradle parts.

15. A joint structure as claimed in claim 12, wherein the positioning elements comprises a bead and a clearance, the bead being formed circumferentially around an outer periphery of the sleeve, and the clearance being defined between opposing ends of the cylindrical members of the bushes positioned between the sleeve and the annular member.

16. A joint structure as claimed in claim 12, wherein each of the bushes has the claw and cradle parts.

* * * * *